(12) United States Patent
Suzuki et al.

(10) Patent No.: US 8,721,141 B2
(45) Date of Patent: May 13, 2014

(54) DOOR LAMP UNIT

(75) Inventors: Hiroyuki Suzuki, Shizuoka (JP); Yusuke Yoshizoe, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/371,781

(22) Filed: Feb. 13, 2012

(65) Prior Publication Data

US 2012/0206929 A1 Aug. 16, 2012

(30) Foreign Application Priority Data

Feb. 14, 2011 (JP) ................... 2011-028110

(51) Int. Cl.
*B60Q 1/00* (2006.01)
*B60Q 1/26* (2006.01)

(52) U.S. Cl.
USPC ........... 362/501; 362/487; 362/488; 362/509; 362/540; 362/542; 362/549

(58) Field of Classification Search
USPC ................... 362/487–507, 509, 540, 542, 549
See application file for complete search history.

(56) References Cited

U.S. PATENT DOCUMENTS

| | | | |
|---|---|---|---|
| 5,528,468 A | 6/1996 | Stanton | |
| 6,092,915 A | 7/2000 | Rensch | |
| 6,536,928 B1 * | 3/2003 | Hein et al. | 362/464 |
| 6,919,800 B2 * | 7/2005 | Wu | 340/463 |
| 2004/0076014 A1 * | 4/2004 | Bach et al. | 362/501 |
| 2005/0068785 A1 * | 3/2005 | Takeda et al. | 362/506 |
| 2006/0256549 A1 | 11/2006 | Sawayanagi et al. | |
| 2007/0014122 A1 * | 1/2007 | Sakiyama et al. | 362/501 |
| 2010/0271837 A1 * | 10/2010 | Yamauchi et al. | 362/549 |

FOREIGN PATENT DOCUMENTS

| | | |
|---|---|---|
| CN | 2401409 Y | 10/2000 |
| CN | 1115506 C | 7/2003 |
| CN | 1576101 A | 2/2005 |
| JP | 2003-291722 A | 10/2003 |

OTHER PUBLICATIONS

Office Action, dated Oct. 2, 2013, issued by the German Patent and Trademark Office in counterpart German Patent Application No. 10 2012 101 111.7.
Office Action dated Dec. 17, 2013 issued by the State Intellectual Property Office of the People's Republic of China in counterpart Chinese Patent Application No. 201210031934.2.

* cited by examiner

*Primary Examiner* — Nimeshkumar Patel
*Assistant Examiner* — Jose M Diaz
(74) *Attorney, Agent, or Firm* — Sughrue Mion, PLLC

(57) ABSTRACT

A lamp unit is provided. A decorative part has a lens. A functional part has a light source. The lamp unit can be assembled on left and right doors to illuminate a predetermined position. The functional part is provided with a functional side lock portion, and the decorative part is provided with a first decorative side lock portion corresponding to a first assembling direction of the functional part and a second decorative side lock portion corresponding to a second assembling direction of the functional part. Both the first decorative side lock portion and the second decorative side lock portion can be fitted into the functional side lock portion.

7 Claims, 8 Drawing Sheets

DOOR LAMP UNIT

The disclosure of Japanese Patent Application No. 2011-028110 filed on Feb. 14, 2011, including specification, drawings and claims is incorporated herein by reference in its entirety.

BACKGROUND

The present invention relates to a lamp unit which includes a decorative part having a lens and a functional part having a light source.

As an example, a related-art lamp unit which includes a decorative part having a lens and a connector part having a light source is disclosed in Patent Document 1. According to the Patent Document 1, the lamp unit is a so-called courtesy lamp and each of the lamps units is individually assembled on left and right doors of a vehicle such as a motor vehicle.

Patent Document 1:JP-A-2003-291722

In the above lamp unit, an assembling direction of the lamp units relative to the left and right doors is restricted when a lens's shape or a lens's cut shape in the decorative part constituting the lamp unit has an orientation. Accordingly, when the lamp unit is assembled on the left and right doors, the directions of the connector part having the light source can be different from each other in the left and right doors. Specifically, the lamp unit becomes in a state as shown in FIG. 8A, and thus the directions of the connector part having the light source can be different from each other in the left and right doors.

In FIGS. 8A and 8B, the reference numeral 1 indicates a left door of the vehicle, 2 indicates a right door of the vehicle, 3 indicates lamp units respectively assembled on the left door 1 and right door 2, 4 indicates a connector part (functional part) having a light source, 5 indicates a decorative part having a lens, 6 indicates a power supply, and 7 indicates a wire harness connecting the power supply 6 and the lamp units 3, 3. The lamp unit 3 is composed of the functional part 4 and the decorative part 5. The wire harness 7 includes a connector which is electrically connected to a terminal.

As is apparent from an arrangement of the wire harness 7, the connecting directions with the lamp units are different from each other in the left and right doors. Accordingly, there is a risk of difficultly arranging the wire harness 7, depending on a shape of a door trim.

Further, there is a risk that, for example, a part of the wire harness 7 indicated by reference numeral 8 undesirably gets into the interior of the lamp unit 3. In the lamp unit 3 disclosed in the Patent Document 1, a lock arm part 9 which serves as assembling parts for the left door 1 and the right door 2 is provided in an approximately central portion of the lens 10. Accordingly, the part of the wire harness is liable to get into the interior of the lamp unit. For example, if the part 8 of the wire harness gets into the interior of the lamp unit to contact the light source 11, there is a risk that a melting of the part of the wire harness can be occurred.

SUMMARY

It is therefore an object of the present invention to provide a lamp unit capable of assembling a functional part on a decorative part regardless of an orientation of the decorative part and preventing the wire harness from getting into the interior thereof.

According to an aspect of embodiments of the present invention, there is provided a lamp unit comprising: a decorative part having a lens; and a functional part having a light source, wherein the lamp unit is configured to be assembled on left and right doors to illuminate a predetermined position from the doors, wherein the functional part is provided with a functional side lock portion, and the decorative part is provided with a first decorative side lock portion corresponding to a first assembling direction of the functional part and a second decorative side lock portion corresponding to a second assembling direction of the functional part, and wherein both the first decorative side lock portion and the second decorative side lock portion are configured to be fitted into the functional side lock portion.

The first decorative side lock portion and the second decorative side lock portion of the decorative part may be formed in an identical shape. That is, the first decorative side lock portion and the second decorative side lock portion may be formed symmetrically to be fittable into the functional side lock portion of the functional part. As the functional part is assembled to the decorative part in the first assembling direction, the functional side lock portion of the functional part is fitted into the first decorative side lock portion. Also, as the functional part is assembled to the decorative part in the second assembling direction, the functional side lock portion of the functional part is fitted into the second decorative side lock portion.

With such a structure, it is possible to achieve an effect of assembling the functional part on the decorative part regardless of the orientation of the decorative part. By this effect, the lamp unit can be easily assembled and thus working property can be improved. Moreover, it is possible to shorten the length of the wire harness as compared to related-art.

The functional side lock portion, the first decorative side lock portion and the second decorative side lock portion may be configured such that the functional part fits in the decorative part by sliding the functional part on the decorative part from a side of the decorative part.

As the functional part is laterally slid from an outer side to an inner side of the decorative part, the functional side lock portion and the first decorative side lock portion are fitted together. Alternatively, the functional side lock portion and the second decorative side lock portion may be fitted together. As the functional part is slidably fitted into the decorative part, the functional part may be pressed by a member of the door side and maintained in a fitted state when the lamp unit is assembled on the doors. Moreover, after the lamp unit is assembled on the doors, the slide movement of the functional part in a separation direction may be restricted by the member of the door side. That is, the fitting state can be maintained.

With such a structure, it is possible to desirably maintain the functional part and the decorative part in a fitted state.

The decorative part may be provided with a plurality of lock arm portions which serve as assembling portions to be assembled on the doors, and the lock arm portions may be disposed at install positions which are located outside the light source and adjacent to four corners of the lens.

Accordingly, it is possible to prevent the wire harness connecting the lamp unit and the power supply from getting into the interior of the lamp unit by the presence and arrangement of the lock arm portions.

With such a structure, an effect of preventing the wire harness from getting into the interior of the lamp unit can be achieved. Accordingly, it is possible to prevent a melting of the wire harness being occurred.

The functional part may be provided with a hood portion which is located at a side opposite to the lens to cover the light source.

Since the light source is covered with the hood portion of the functional part, it is possible to prevent the light source from contacting the wire harness.

With such a structure, an effect of preventing the wire harness from contacting the light source can be achieved. Accordingly, it is possible to reliably prevent a melting of the wire harness being occurred.

BRIEF DESCRIPTION OF THE DRAWINGS

In the accompanying drawings:

FIG. 1A is an arrangement view of the lamp unit, FIG. 1B is a perspective view illustrating the lamp unit where a functional part is assembled on a decorative part in a first assembling direction, and FIG. 1C is a perspective view illustrating the lamp unit where the functional part is assembled on the decorative part in a second assembling direction;

FIG. 2A is an exploded perspective view of the lamp unit and FIG. 2B is a perspective view of a socket constituting the functional part of the lamp unit;

FIG. 3A is a perspective view of the lamp unit, FIG. 3B is a side view of the decorative part of the lamp unit, and FIG. 3C is a rear view of the decorative part of the lamp unit;

FIG. 4A is a perspective view of the lamp unit immediately before assembling the lamp unit on a door of a vehicle, and FIG. 4B is a perspective view of the lamp unit after assembling the lamp unit on the door of the vehicle;

FIG. 5A is a perspective view of the lamp unit immediately before assembling the functional part on the decorative part, and FIG. 5B is a perspective view of the lamp unit after assembling the functional part on the decorative part;

FIG. 6A is a perspective view of the lamp unit and the wire harness, and FIG. 6B is a side view of the lamp unit and the wire harness;

FIG. 7A is a perspective view of the lamp unit and the wire harness in the comparative example and FIG. 7B is a side view of the lamp unit and the wire harness in the comparative example; FIG. 8A is an arrangement view of the related-art lamp unit, and FIG. 8B is a perspective view of the related-art lamp unit.

DETAILED DESCRIPTION OF THE EMBODIMENTS

The lamp unit includes a decorative part having a lens and a functional part having a light source. The decorative part is provided with lock portions which are formed in an identical shape. The lock portions are arranged in a bilateral symmetric fashion and allow the functional part to be fitted into the decorative part. The lamp unit is configured to prevent the wire harness from getting into the interior thereof.

Hereinafter, an embodiment of the present invention will be described with reference to the accompanying drawings.

Figure 1A:
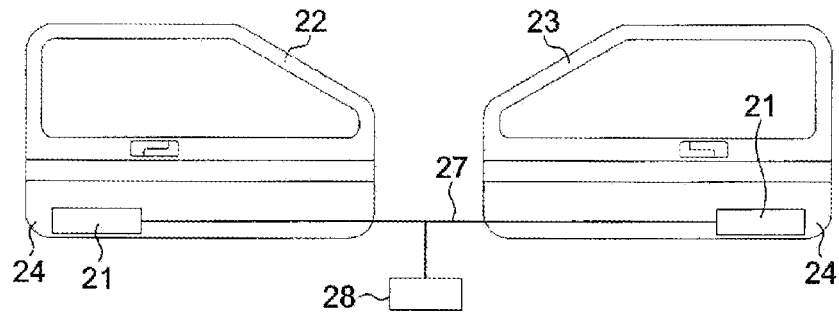
FIGS. 1A to 1C are views illustrating a lamp unit according to an embodiment of the present invention.
Figure 1B:
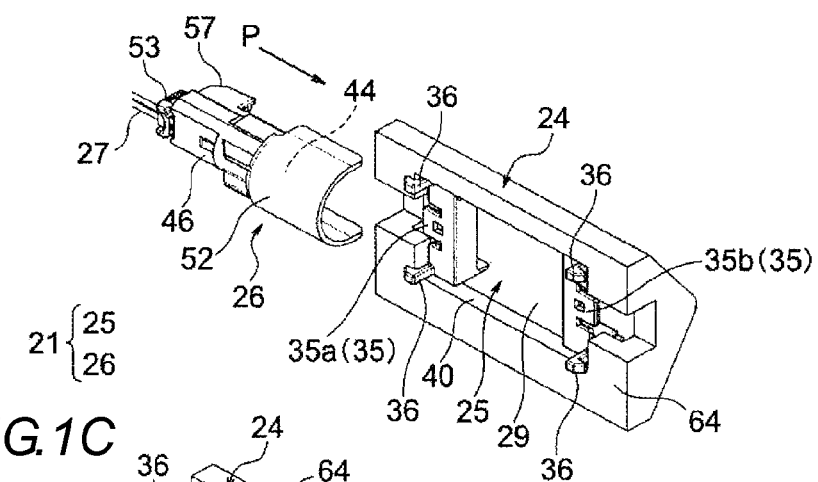
Figure 1C:
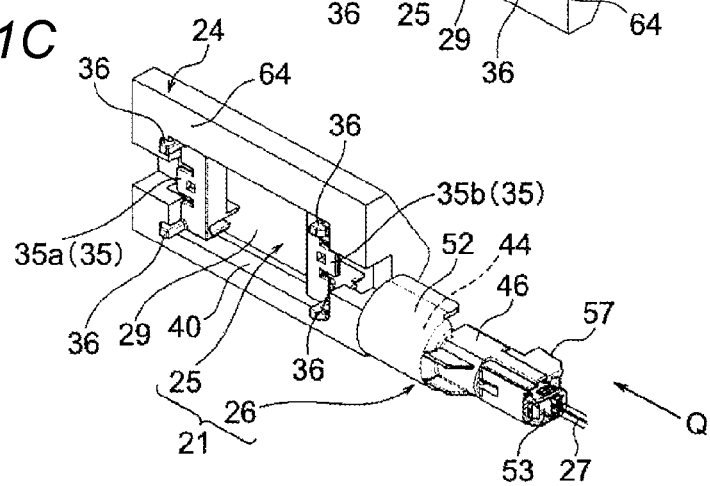
Figure 2A:
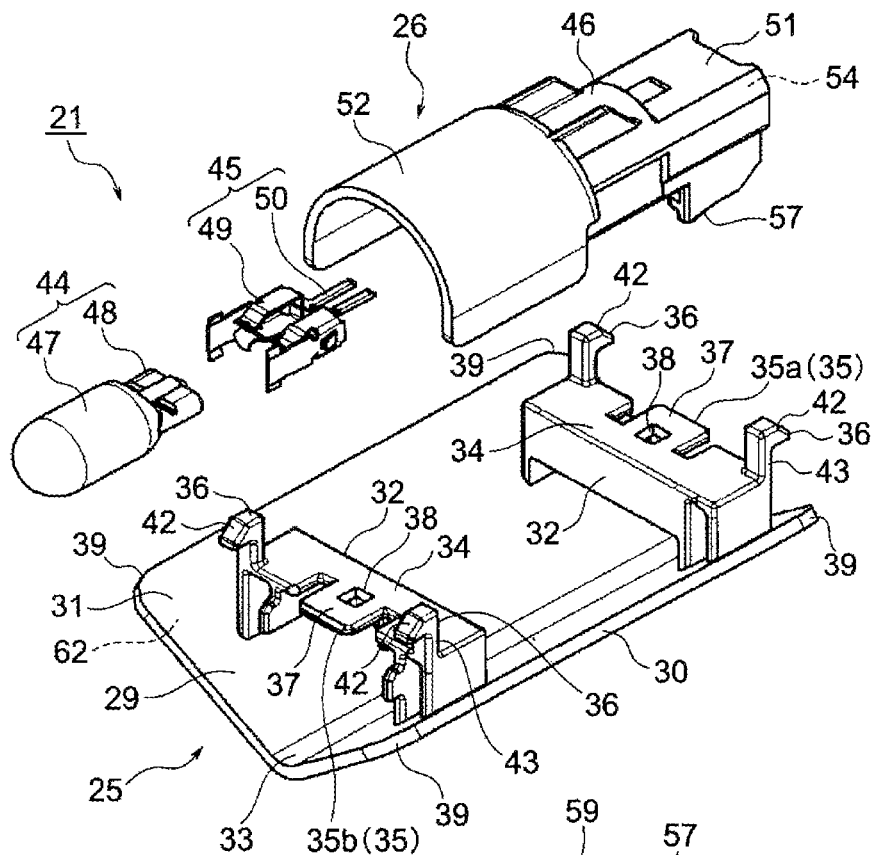
FIGS. 2A and 2B are views illustrating the lamp unit according to the embodiment and the functional part.
Figure 2B:
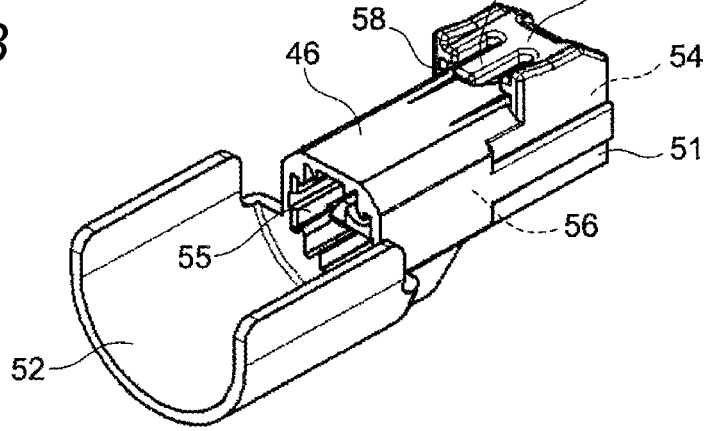
Figure 3A:
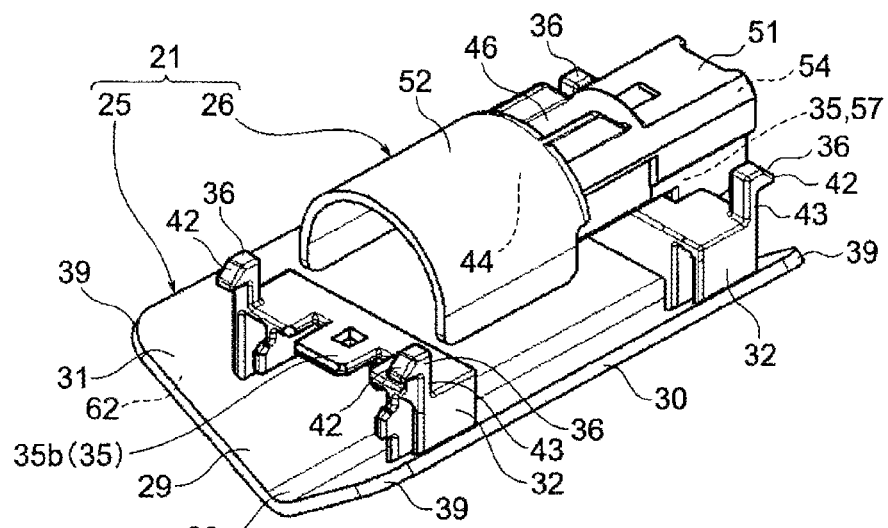
FIGS. 3A to 3C are views illustrating the lamp unit according to the embodiment and the decorative part.
Figure 3B:
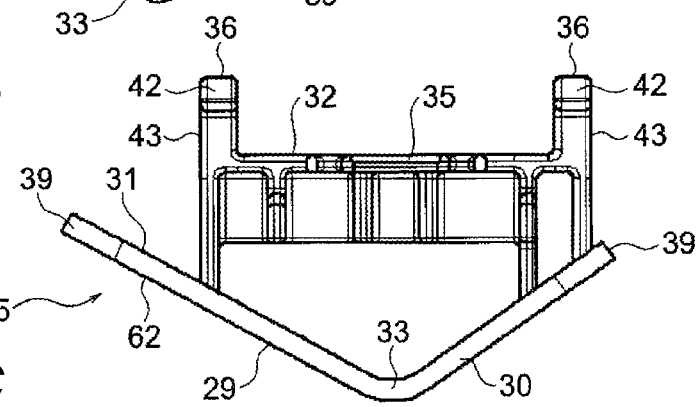
Figure 3C:
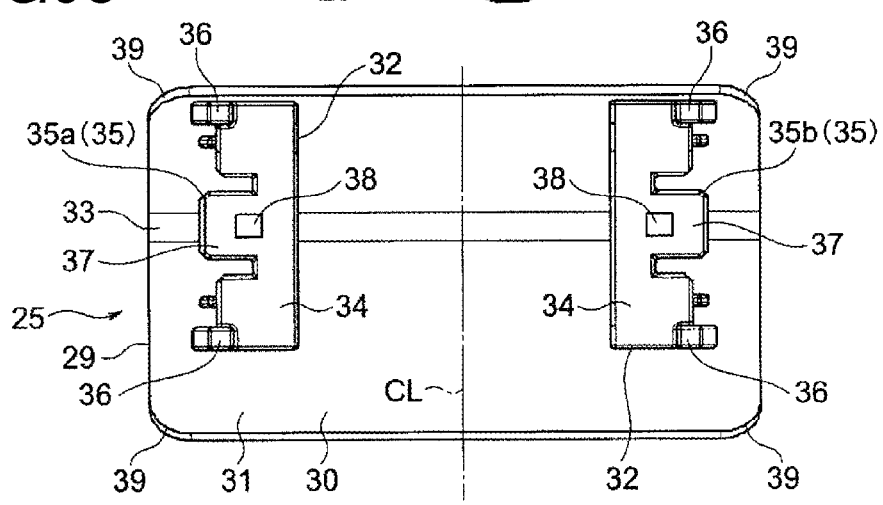
Figure 4A:
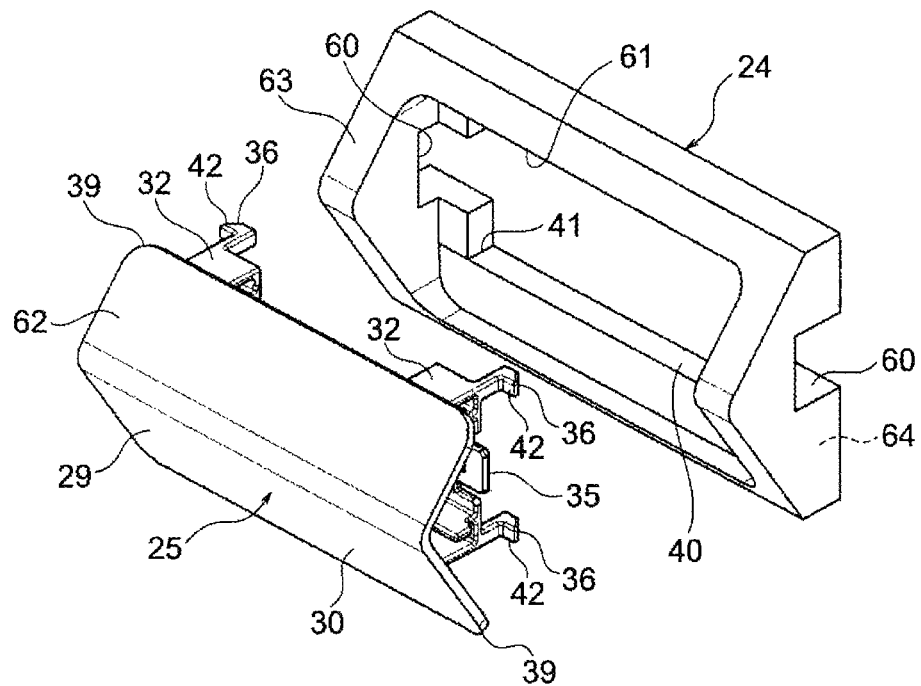
FIGS. 4A and 4B are views illustrating the lamp unit according to the embodiment.
Figure 4B:
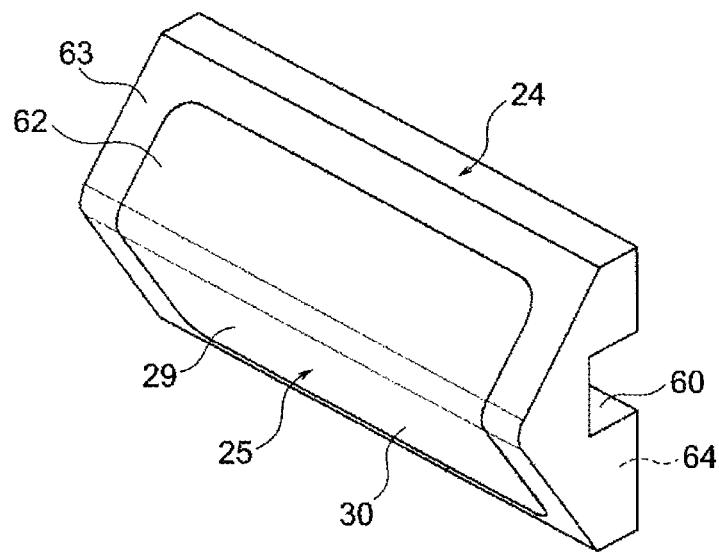
Figure 5A:
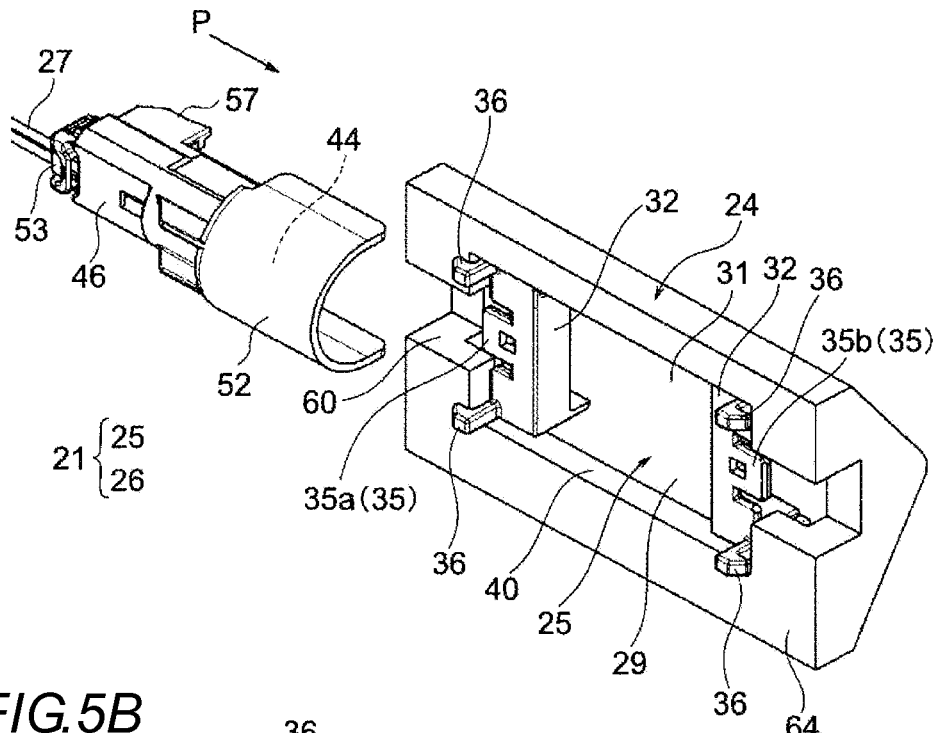
FIGS. 5A and 5B are views illustrating the lamp unit according to the embodiment.
Figure 5B:
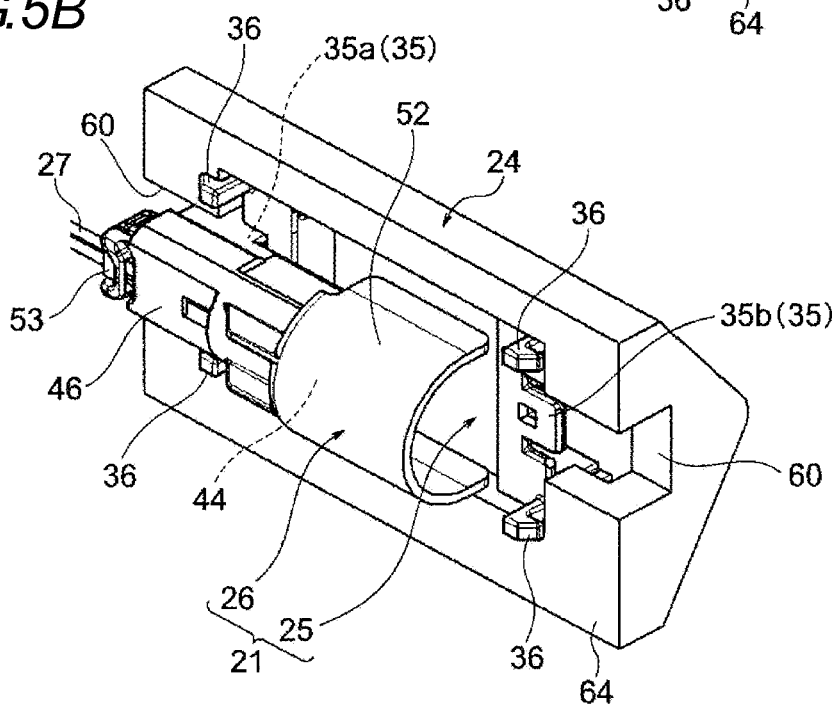
Figure 6A:
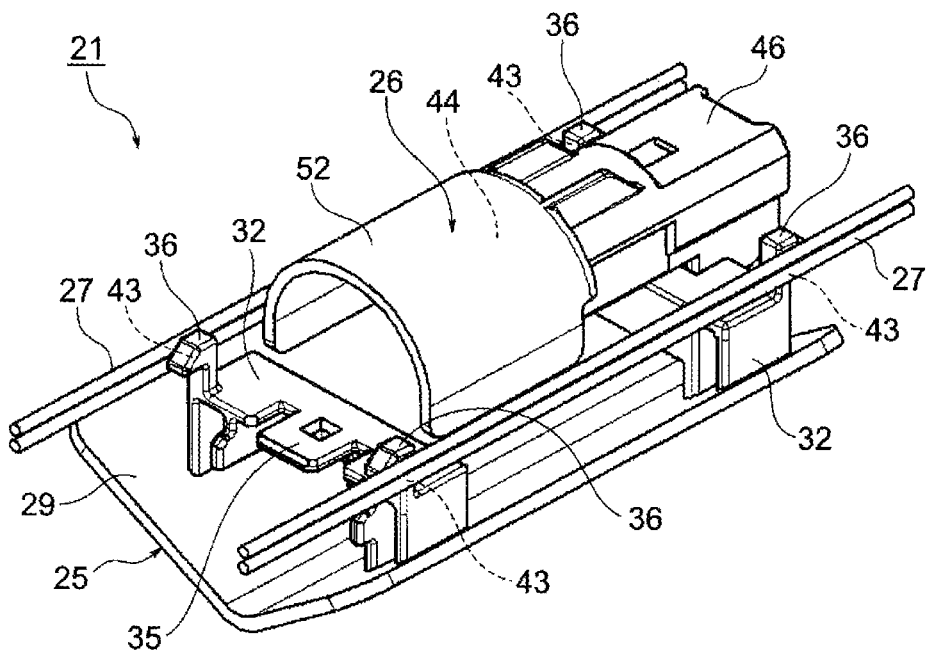
FIGS. 6A and 6B are views illustrating the lamp unit and a wire harness according to the embodiment.
Figure 6B:
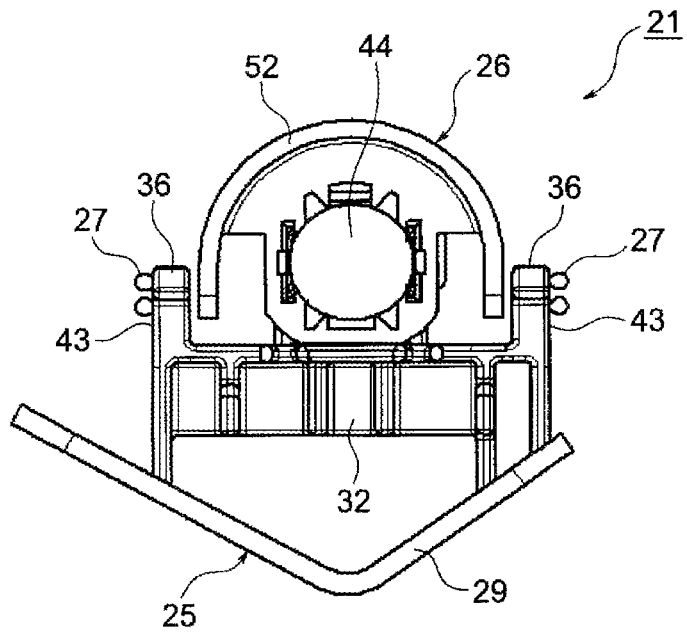
Figure 7A:
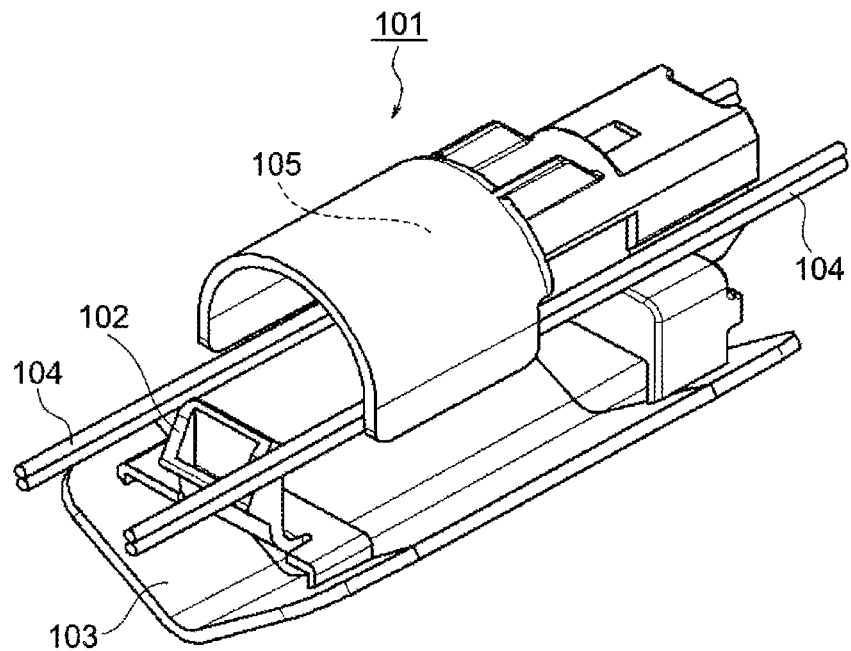
FIGS. 7A and 7B are views illustrating a comparative example for FIGS. 6A and 6B.
Figure 7B:
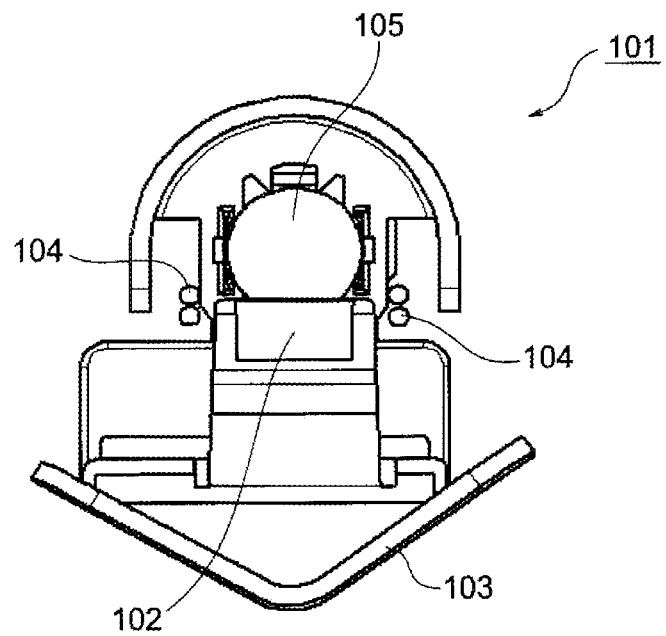
Figure 8A:
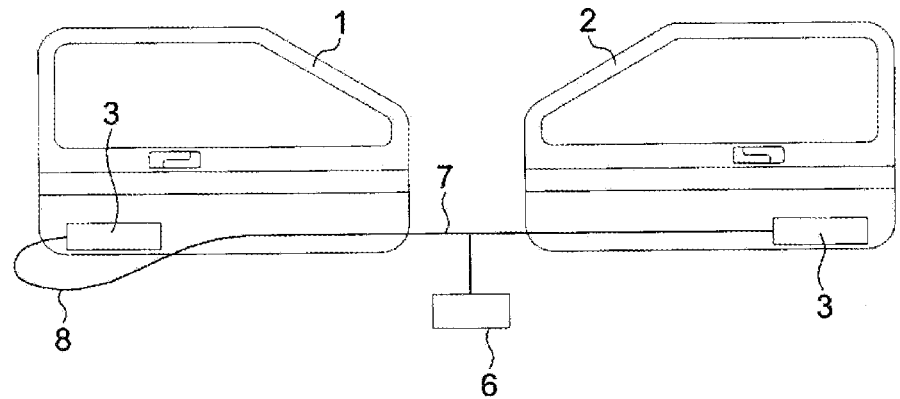
FIGS. 8A and 8B are views illustrating a related-art lamp unit.
Figure 8B:
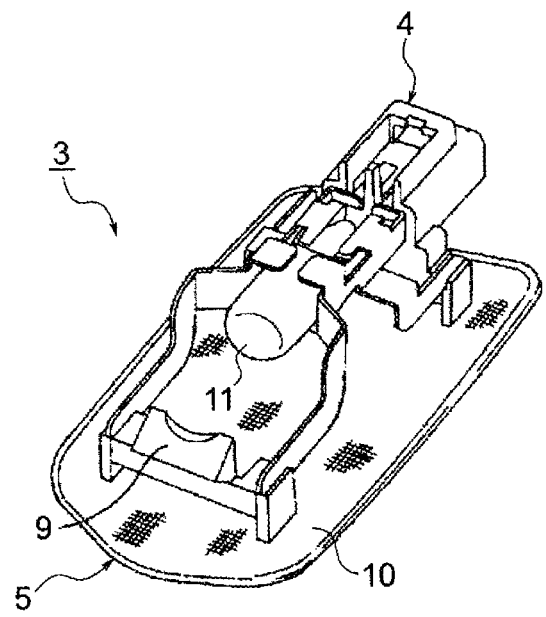

FIGS. 1A to 1C are views illustrating a lamp unit according to the embodiment of the present invention. FIGS. 2A and 2B are views illustrating the lamp unit and the functional part, FIGS. 3A to 3C are views illustrating the lamp unit and the decorative part, FIGS. 4A and 4B are views illustrating the lamp unit when assembling the decorative part on the door of the vehicle, FIGS. 5A and 5B are views illustrating the lamp unit when assembling the functional part on the decorative part, FIGS. 6A and 6B are views illustrating the lamp unit where a wire harness is prevented from getting into the interior of the lamp unit, and FIGS. 7A and 7B are views illustrating a comparative example for FIGS. 6A and 6B.

In FIG. 1A, reference numeral 21 indicates a lamp unit according to the present invention. Each of the lamp units 21 is assembled on a left door 22 and a right door 23 of a vehicle such as a motor vehicle to illuminate a predetermined position from the left door 22 and the right door 23. The lamp unit 21 serves as a courtesy lamp and includes a decorative part 25 and a functional part 26, as shown in FIGS. 1B and 1C. The lamp unit 21 is connected to a power supply 28 via a wire harness 27.

As is apparent from the following descriptions, in the lamp unit 21, the functional part 26 can be assembled on the decorative part 25 regardless of an orientation of the decorative part 25. Specifically, the functional part 26 can be fitted into the decorative part 25 in a first assembling direction indicated by arrow P as well as a second assembling direction indicated by arrow Q. First, the configuration and structure of the lamp unit 21 will be described.

In FIG. 2A and FIGS. 3A to 3C, the decorative part 25 of the lamp unit 21 includes a lens 29 made of a translucent synthetic resin (although a bezel is not employed in this embodiment, for example, the lens may include the bezel). As shown in FIG. 2A and FIGS. 3A to 3C, the lens 29 includes a lens main body 30 which is rectangular in a plan view and bent in an L-shape in a side view and a pair of fixing parts 32 which are integrally formed with an inner surface 31 of the lens main body 30. This shape is only illustrative. The shape of the lens main body 30 of the lens 29 is configured to have an orientation (see FIG. 3B). The lens main body 30 is formed with lens cuts (not illustrated).

The pair of fixing parts 32 is formed substantially into a bridge-shape to bridge over a bent portion 33 of the lens main body 30 bent in an L-shape. The pair of fixing parts 32 is shaped in a bilateral symmetric fashion (line symmetric fashion) about a center line CL (see FIG. 3B). Since the pair of fixing parts 32 is symmetrically formed, hereinafter, only one of the fixing parts will be described.

Each of the fixing parts 32 includes a pedestal 34, a decorative side lock portion 35 disposed in a central position of the pedestal 34 and a pair of lock arm portions 36 provided in fixing leg portions of the pedestal 34. The decorative side lock portion 35 is configured to be fitted with the functional part 26 and includes a flexible insertion plate 37 and a fitting hole 38 formed to penetrate through the insertion plate 37. The decorative side lock portions 35 are divided into two parts so as to correspond a first assembling direction indicated by arrow P and a second assembling direction indicated by arrow Q (see FIGS. 1B and 1C). One of the two parts is referred to as a first decorative side lock portion 35a and the other of the two parts is referred to as a second decorative side lock portion 35b. Further, as long as the decorative side lock portion 35 (the first decorative side lock portion 35a and the second decorative side lock portion 35b) is shaped to form a fitting structure (an engagement structure), the shape of the decorative side lock portion is not particularly limited.

The pair of lock arm portions 36 is fitted with the assembling portions 24 (see FIGS. 1B and 1C) of the left door 22 and the right door 23 and are formed in a flexible arm shape. The pair of lock arm portions 36 is provided at a side adjacent to a corner position 39 of the lens main body 30. Further, the pair of lock arm portions 36 is provided to cause an engagement projection 42 to be engaged with a corner position 41 of a fitting frame part 40 in the assembling portions 24 (see FIGS. 1B and 1C and FIG. 4A).

The pair of lock arm portions 36 includes a wire restricting part 43. The wire restricting part 43 is configured to prevent the wire harness 27 from getting into inside of the pair of lock arm portions 36.

The functional part 26 of the lamp unit 21 includes a light source 44, a busbar 45 and a socket 46. The functional part 26 has a width narrower than that of the pair of lock arm portions 36 of the fixing part 32 in the decorative part 25.

The light source 44 is an electronic component such as a bulb or LED emitting a light when being supplied with an electric power and includes an emitting part 47 and an electric connecting part 48.

The busbar 45 is a circuit component for connecting the light source 44 and a connector portion 41 (described later) of the socket 46 and is formed by bending a conductive metal plate in a predetermined shape. The busbar 45 includes a connecting part 45 connected to the light source and a connector terminal part 50.

As shown in FIGS. 2A and 2B, the socket 46 is a component made of an insulating synthetic resin and integrally includes a connector potion 51 and a hood portion 52. The connector portion 51 includes a connector fitting portion 54 into which a connector 53 on a terminal side of the wire harness 27 can be fitted, a light source mounting portion 55 on which the light source 44 is mounted, a busbar accommodating portion 56 in which the busbar 45 is accommodated, a functional side lock portion 57 which is fitted into a decorative side lock portion 35 (first decorative side lock portion (35a) and second decorative side lock portion (35b)).

As mentioned above, the functional side lock portion 57 is fitted into the decorative side lock portion 35 and includes an insertion hole 58 into which the insertion plate 37 of the decorative side lock portion 35 is inserted and a locking arm portion 59 which is engaged with the fitting hole 38 of the decorative side lock portion 35.

The hood portion 52 is located on a side opposite to the lens main body 30 in the decorative part 25 to cover the light source 44 and formed in an approximately semi-cylinder shape. The hood portion 52 is dimensioned so that a radius of the approximately semi-cylinder shape is slightly narrower than a gap between the pair of lock arm portions 36 of the fixing part 32 in the decorative part 25. That is, the hood portion 52 is dimensioned so that the wire harness 27 cannot get into the hood portion. In this regard, reference is made to FIGS. 6A and 6B.

In FIGS. 4A and 4B, the assembling portion 24 indicates a portion of the lamp unit 21 assembled to the door and includes the fitting frame part 40, as mentioned above. Four lock arm portions 36 of the decorative part 25 in the lamp unit 21 are engaged in four corner positions of the fitting frame part 40. In the assembling portion 24, reference numeral 60 indicates a relief portion for relieving the functional part 26 in the lamp unit 21. The relief portion 60 is formed as a groove in a predetermined depth.

Next, an assembling operation of the lamp unit 21 will be explained based on the above configuration and structure.

Referring to FIG. 4A, the decorative part 25 is placed to match the position of the opening 61 of the assembling portion 24 and pressed from the pair of fixing parts 32 toward the opening 61. In this way, the four lock arm portions 36 are engaged with four corner positions of the fitting frame part 40 and thus assembling operation of the decorative part 25 is completed, as shown in FIG. 4B. At this time, an outer surface 62 of the lens main body 30 is flush with an outer surface 63 of the assembling portion 24.

In an inner surface 64 side of the assembling portion 24, as shown in FIG. 5A, the functional part 26 is slidingly moved along the first assembling direction indicated by arrow P and fitted into the decorative part 25. By doing so, as shown in FIG. 5B, an assembling operation of the functional part 26 is completed and thus an assembling operation of the lamp unit 21 is also completed. When the functional part 26 is fitted into the decorative part 25, the functional side lock portion 57 of the functional part 26 is fitted with the decorative side lock portion 35 of the decorative part 25 and thus assembling operation is completed.

Meanwhile, since the assembling operation of the functional part 26 in the second assembling direction (see FIG. 1C) indicated by arrow Q is the same as the assembling operation in the first assembling direction, detailed description thereof is omitted.

Although the assembling operation is performed by assembling the decorative part 25 on the assembling portion 24 and then fitting the functional part 26 into the decorative part 25, the assembling operation is not limited to this order. That is, it is also possible to perform the assembling operation by fitting the functional part 26 into the decorative part 25 to form the lamp unit 21 and then assembling the lamp unit 21 on the assembling portion 24.

For example, as a rear end of the socket 46 is pressed by a door component such as a silencer during the assembling operation, a sliding movement of the functional part 26 in a separation direction is restricted. And thus, the functional part 26 and the decorative part 25 are maintained in a fitting state.

Subsequently, a principle for preventing the wire harness 27 from getting into the interior of the lamp unit will be described by referring to the configuration and structure mentioned above.

Referring to FIGS. 6A and 6B, it is possible to prevent the wire harness 27 from getting into the interior of the lamp unit 21 by the arrangement or structure of the four lock arm portion 36 of the decorative part 25 and the wire restricting part 43 in the lamp unit 21. Further, the lamp unit 21 has a configuration that the functional part 26 includes the hood portion 52, and thus it is possible to reliably prevent the wire harness 27 from getting into the interior of the lamp unit 21. Accordingly, the wire harness 27 does not contact the light source 44 and thus the melting of the wire harness 27 can be avoided.

For example, in the case of a lamp unit 101 of a comparative example as shown in FIGS. 7A and 7B, since a lock arm portion 102 is disposed at an approximately central position of a lens 103, there is a risk that a wire harness 104 gets into the interior of the lamp unit. Also, if the wire harness 104 contacts a light source 105, melting of the wire harness can be occurred.

According to the lamp unit 21 as mentioned above by referring to FIGS. 1A to 6B, the functional part 26 can be fitted and assembled on the decorative part 25 in the first assembling direction indicated by arrow P as well as the second assembling direction indicated by arrow Q. Further, since the functional part 26 can be assembled regardless of the orientation of the decorative part, working property can be improved. Accordingly, it is possible to improve the operability of the lamp unit 21 as compared to prior art. Further, according to this lamp unit 21, it is possible to shorten the length of the wire harness 27 as compared to prior art.

In addition, according to the lamp unit 21, it is possible to prevent the wire harness 27 from getting into the interior of the lamp unit by the arrangement or structure of the lock arm portion 36 and a wire restricting portion 43. Further, since the lamp unit 21 has a configuration that the functional part 26 includes the hood portion 52, it is possible to reliably prevent the wire harness 27 from contacting the light source 44. Accordingly, according to the lamp unit 21, the melting of the wire harness 27 can be avoided.

The present invention can be variously modified without departing from the scope and spirit thereof.

What is claimed is:

1. A lamp unit comprising:
a decorative part having a lens; and
a functional part having a light source,
wherein the lamp unit is configured to be assembled on left and right doors to illuminate a predetermined position from the doors,
wherein the functional part is provided with a functional side lock portion, and the decorative part is provided with a first decorative side lock portion corresponding to a first assembling direction of the functional part and a second decorative side lock portion corresponding to a second assembling direction of the functional part, the functional part and the decorative part capable of being fitted interchangeably in both the first assembling direction or the second assembling direction, and wherein the first assembling direction and the second assembling direction are opposite to each other, and
wherein both the first decorative side lock portion and the second decorative side lock portion are configured to be fitted into the functional side lock portion,
wherein the first decorative side lock portion is configured to fit into the functional side lock portion when the functional part and the decorative part are brought together in the first assembling direction so that the functional part and the decorative part are oriented in a first direction with respect to each other upon fitting, and
wherein the second decorative side lock portion is configured to fit into the functional side lock portion when the functional part and the decorative part are brought together in the second assembling direction so that the functional part and the decorative part are oriented in a second direction with respect o each other upon fitting.

2. The lamp unit according to claim 1, wherein the functional side lock portion, the first decorative side lock portion and the second decorative side lock portion are configured such that the functional part fits in the decorative part by sliding the functional part on the decorative part from a side of the decorative part.

3. The lamp unit according to claim 1,
wherein the decorative part is provided with a plurality of lock arm portions which serve as assembling portions to be assembled on the doors, and
wherein the lock arm portions are disposed at install positions which are located outside the light source and adjacent to four corners of the lens.

4. The lamp unit according to claim 3, wherein the functional part is provided with a hood portion which is located at a side opposite to the lens to cover the light source.

5. The lamp unit according to claim 1, wherein the first decorative side lock portion and the second decorative side lock portion are symmetrically formed on the decorative part.

6. The lamp unit according to claim 1, wherein the first decorative side lock portion and the second decorative side lock portion are configured to be selectively fitted to a same one of the functional side lock portion.

7. The lamp unit according to claim 1, wherein the first decorative side lock portion and the second decorative side lock portion each include a flexible insertion plate having a fitting hole formed to penetrate through the insertion plate, and the flexible insertion plate is disposed at a center portion of a pedestal shaped portion having a pair of leg portions.

* * * * *